United States Patent
Senekerimyan (10) Patent No.: US 9,341,752 B2
(45) Date of Patent: May 17, 2016

(54) VIEWPORT PROTECTOR FOR AN EXTREME ULTRAVIOLET LIGHT SOURCE

(71) Applicant: ASML Netherlands B.V., Veldhoven (NL)

(72) Inventor: Vahan Senekerimyan, San Diego, CA (US)

(73) Assignee: ASML Netherlands B.V., Veldhoven (NL)

( * ) Notice: Subject to any disclaimer, the term of this patent is extended or adjusted under 35 U.S.C. 154(b) by 569 days.

(21) Appl. No.: 13/671,378

(22) Filed: Nov. 7, 2012

(65) Prior Publication Data

US 2014/0126043 A1 May 8, 2014

(51) Int. Cl.

| G02B 5/20 | (2006.01) |
|---|---|
| G02B 5/00 | (2006.01) |
| F16J 15/02 | (2006.01) |
| G02B 7/00 | (2006.01) |
| H01J 35/18 | (2006.01) |
| H05G 2/00 | (2006.01) |

(52) U.S. Cl.
CPC ............... *G02B 5/003* (2013.01); *F16J 15/02* (2013.01); *G02B 7/00* (2013.01); *G02B 7/007* (2013.01); *H01J 35/18* (2013.01); *H05G 2/008* (2013.01); *Y10T 403/52* (2015.01)

(58) Field of Classification Search
CPC ............ G02B 1/10; G02B 1/105; G02B 1/11; G02B 1/111; G02B 1/113; G02B 1/115; G02B 1/116; G02B 1/118; G02B 1/12; G02B 5/003; G02B 5/005; G02B 5/20; G02B 5/208; G02B 5/22; G02B 5/26; G02B 5/28; G02B 5/281; G02B 5/282; G02B 5/283
See application file for complete search history.

(56) References Cited

U.S. PATENT DOCUMENTS

| 4,247,190 | A | | 1/1981 | Hashimoto et al. |
|---|---|---|---|---|
| 5,359,620 | A | | 10/1994 | Akins |
| 5,804,827 | A | * | 9/1998 | Akagawa et al. ........ 250/370.06 |
| 5,933,273 | A | * | 8/1999 | Ferrante et al. ............... 359/359 |
| 7,196,343 | B2 | | 3/2007 | Van Herpen et al. |
| 8,000,212 | B2 | | 8/2011 | Senekerimyan et al. |
| 8,173,985 | B2 | | 5/2012 | Bergstedt et al. |
| 2005/0115941 | A1 | | 6/2005 | Sukhman et al. |
| 2006/0207290 | A1 | | 9/2006 | Ide et al. |
| 2007/0002474 | A1 | | 1/2007 | Amemiya et al. |
| 2010/0085547 | A1 | * | 4/2010 | Labetski et al. ................ 355/53 |
| 2011/0121515 | A1 | | 5/2011 | Crawford |
| 2011/0140008 | A1 | | 6/2011 | Bergstedt et al. |
| 2011/0141865 | A1 | | 6/2011 | Senekerimyan et al. |
| 2012/0228523 | A1 | * | 9/2012 | Manchikanti et al. ..... 250/493.1 |

OTHER PUBLICATIONS

International Search Report and Written Opinion of the International Searching Authority, for counterpart International Application No. PCT/US2013/066239, mailed Apr. 16, 2014, 9 pages.

* cited by examiner

*Primary Examiner* — Thong Nguyen
(74) *Attorney, Agent, or Firm* — DiBerardino McGovern IP Group LLC (57) ABSTRACT

A protector for a viewport of a vacuum chamber includes a substrate material that absorbs radiation having a wavelength of an amplified light beam and radiation having a wavelength included in an emission spectra of a target material that produces EUV light when ionized by the amplified light beam. The substrate material transmits one or more of visible or near-infrared light. The protector also includes a layer formed on the substrate material, and the layer reflects radiation having the wavelength of the amplified light beam.

28 Claims, 10 Drawing Sheets

VIEWPORT PROTECTOR FOR AN EXTREME ULTRAVIOLET LIGHT SOURCE

TECHNICAL FIELD

The disclosed subject matter relates to a viewport protector for an extreme ultraviolet (EUV) light source.

BACKGROUND

Extreme ultraviolet ("EUV") light, for example, electromagnetic radiation having wavelengths of around 50 nm or less (also sometimes referred to as soft x-rays), and including light at a wavelength of about 13 nm, can be used in photolithography processes to produce extremely small features in substrates, for example, silicon wafers.

Methods to produce EUV light include, but are not necessarily limited to, converting a material into a plasma state that has an element, for example, xenon, lithium, or tin, with an emission line in the EUV range. In one such method, often termed laser produced plasma ("LPP"), the required plasma can be produced by irradiating a target material, for example, in the form of a droplet, stream, or cluster of material, with an amplified light beam that can be referred to as a drive laser. For this process, the plasma is typically produced in a sealed vessel, for example, a vacuum chamber, and monitored using various types of metrology equipment.

SUMMARY

In one general aspect, an assembly includes a protector for a viewport of a vacuum chamber. The protector includes a substrate material that absorbs radiation having a wavelength of an amplified light beam and radiation having a wavelength included in an emission spectra of a target material that produces EUV light when ionized by the amplified light beam. The substrate material transmits one or more of visible or near-infrared light. The protector also includes a layer formed on the substrate material, and the layer reflects radiation having the wavelength of the amplified light beam. The assembly also includes a mount that holds the protector with the layer facing towards the interior of the vacuum chamber.

Implementations can include one or more of the following features. The substrate material can be a glass pellicle. The amplified light beam can have a wavelength of about 10.6 μm. The layer can transmit one or more of visible or near-infrared radiation. In some implementations, the layer only transmits radiation having a wavelength in a spectral band between 845 nm and 865 nm, 800 nm and 840 nm, or 1050 nm and 1090 nm. The mount can include a holder that receives and surrounds the protector, and the holder can fit into an aperture defined by the viewport. The mount can further include a locking element that secures the protector in the holder. The holder and the locking element can be ring-shaped. The locking element and the holder can have corresponding threads, and the locking element can be screwed into the holder to secure the protector in the holder. At least a portion of the viewport can be at least a portion of the mount. The layer can reflect the radiation having a wavelength included in an emission spectra of a target material that produces EUV light when ionized by the amplified light beam. The wavelength included in the emission spectral and the wavelength of the amplified light beam can be different.

In another general aspect, an extreme ultraviolet (EUV) light source includes a vacuum chamber that receives an amplified light beam, a viewport coupled to the vacuum chamber, and a protector coupled to the viewport and facing towards the opening to the interior of the vacuum chamber. The vacuum chamber includes a sidewall that defines an opening to an interior of the vacuum chamber. The protector includes a substrate material that absorbs radiation having a wavelength of the amplified light beam and a wavelength included in an emission spectra of a target material that produces EUV light when ionized by the amplified light beam, and that transmits one or more of visible or near-infrared light. The protector also includes a layer formed on the substrate material. The layer reflects radiation having the wavelength of the amplified light beam.

Implementations can include one or more of the following features. The mount can be configured to couple the protector to the viewport. The substrate can be a glass pellicle. The viewport can include a ring-shaped disk that defines an aperture, and the protector can be coupled to the viewport by placing the protector in the viewport such that the layer of the protector faces toward the interior of the vacuum chamber and a center of the protector corresponds with a center of the aperture. The mount can include standard copper gasket configured for placement between the viewport and the vacuum chamber. The layer can transmit one or more of visible or near infrared radiation.

In another general aspect, a method of protecting a viewport of an extreme ultraviolet (EUV) light source includes mounting a protector in a viewport, the protector including a substrate that absorbs radiation in a first spectral band and transmits radiation in a second spectral band, and a layer on the substrate that reflects radiation in the first spectral band, with the viewport including a window material and a flange. A gasket is placed between the viewport and a valve assembly coupled to an opening defined by a vacuum chamber, and a vacuum seal is created between the viewport and the interior of the vacuum chamber.

Implementations can include one or more of the following features. The first spectral band can include 10.6 μm. The protector can be placed in a holder in a viewport, and mounting the protector in the viewport can include placing the holder in the viewport.

In another general aspect, a mount for an extreme ultraviolet (EUV) light source includes a holder that receives a protector and is placed in a viewport that is configured to be sealed to a vacuum chamber with a standard gasket. The holder defines a longitudinal axis and includes a side wall that defines a passage that is centered on the longitudinal axis. The mount also includes a locking element that defines an aperture and having an exterior surface that connects with an interior surface of the holder, where connecting the locking element to the holder secures the protector in the holder with the protector being substantially unobstructed along the longitudinal axis.

Implementations of any of the techniques described above can include a viewport assembly, a viewport protector, a mount for holding a viewport protector, a vacuum chamber that includes a viewport with a viewport protector, an apparatus, a system, a kit for retrofitting an existing viewport with a viewport protector, or a method. The details of one or more implementations are set forth in the accompanying drawings and the description below. Other features will be apparent from the description and drawings, and from the claims.

DESCRIPTION

A protector for preventing or minimizing radiative heating of a viewport of an extreme ultraviolet (EUV) light source is disclosed. A viewport is an observation mechanism that is positioned relative to an opening defined by a wall of a vacuum vessel, and the viewport includes a window material through which the interior of the vacuum vessel can be viewed. During operation of the light source, the window material can be radiatively heated by light that is inside of the vacuum vessel. For example, the window material can be heated by absorbing some of the light that is inside of the vacuum vessel. Heating of the window material can cause the window to crack and/or experience thermal lensing.

The protector is positioned relative to the interior of the vacuum chamber such that the protector reflects light capable of heating the window material back into the vacuum chamber. Alternatively or additionally, the protector can absorb some or all of the light that is capable of heating the window material to prevent or reduce the heating of the window material. The light capable of heating the window material can include light that has a wavelength that is absorbed by the window material. By reflecting the light capable of heating the window material back into the interior of the vacuum chamber, and/or by absorbing the light capable of heating the window material before the light reaches the window material, the protector prevents or substantially reduces the radiative heating of the window material. The protector can be a glass pellicle with a coating that reflects light capable of radiatively heating the window material and the glass pellicle.

EUV light can be produced by converting a target material, such as tin, that has an emission line in the EUV range, into a plasma state. In one example technique, the target material is converted into a plasma state by irradiating the target material with an amplified light beam in a vacuum chamber. Conversion to the plasma state releases radiation in the emission spectrum of the target material. In addition to EUV light, the emission spectrum can include deep ultraviolet (DUV) light, visible light, near infrared (NIR) light, and mid-wavelength infrared (MWIR) light. Further, the interaction between the amplified light beam and the target material scatters and reflects the amplified light beam. The scattered and reflected amplified light beam is referred to as the incident light. The incident light also can include light that is emitted from converted plasma.

In the absence of the protector, some of the incident light, particularly the reflected amplified light beam and infrared light generated from the plasma emission, can be absorbed by the window material and, consequently, heat the viewport window material. The heating can cause thermal gradients on the window material and can lead to cracking and/or thermal lensing. Cracking of the window material can cause system failure by destroying the vacuum seal. Thermal lensing can distort images collected by a metrology module that images the interior of the vacuum chamber through the viewport. Because the images from the metrology modules are used for system diagnostics, such as steering of the stream of target material droplets, distorted images can reduce system performance.

As discussed in greater detail below, the protector reduces or eliminates the heating of the viewport window material, thus improving the performance of the EUV light source. Furthermore, the protector can also aid in increasing the amount of EUV light produced by allowing the amplified light beam to operate at a higher duty cycle. An increased duty cycle generates more EUV light, but also generates more incident light, which can lead to increased heating of the viewport window material. Thus, the protector also can allow the light source to produce more EUV light while also reducing the chance of system failure or performance degradation.

A description of the components of an LPP EUV light source will initially be described before providing a more detailed description of the viewport protector.

Figure 1:
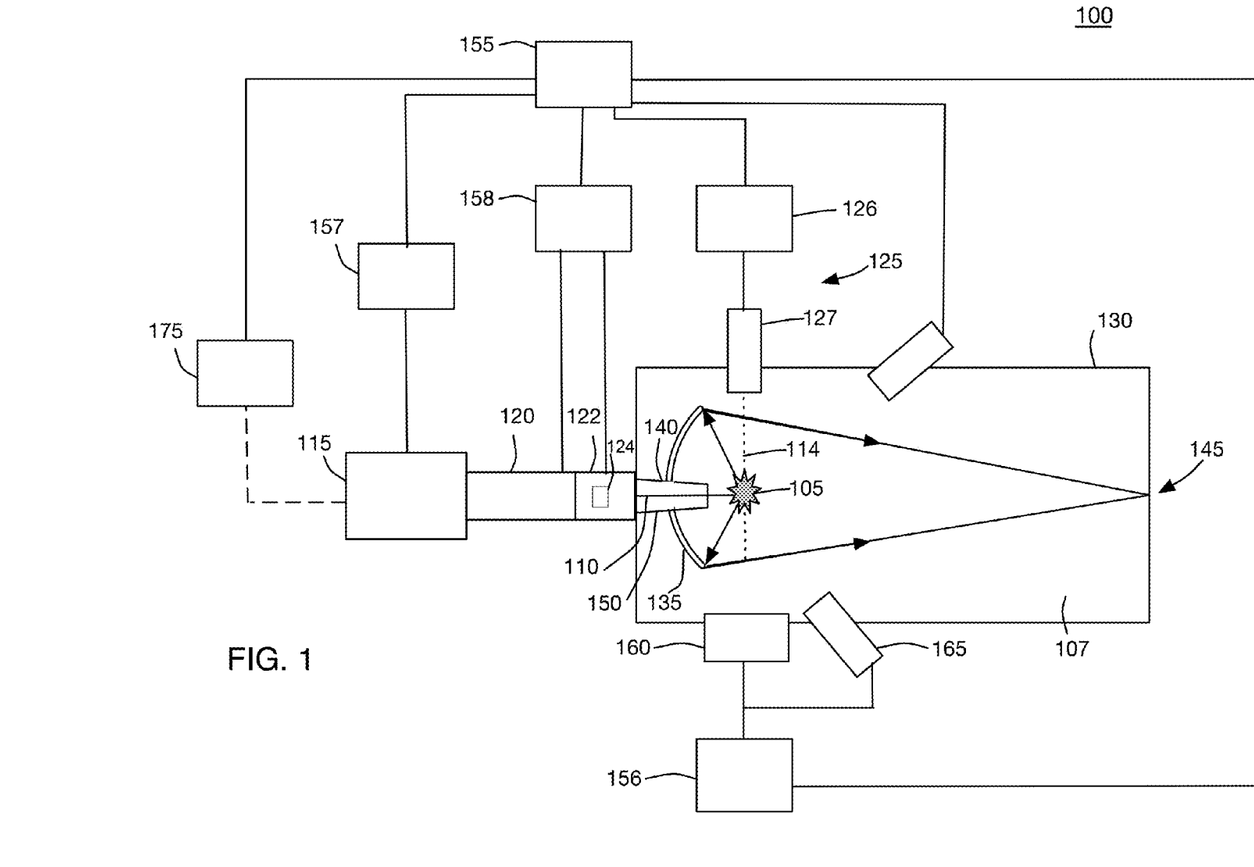
FIG. 1 is a block diagram of a laser produced plasma extreme ultraviolet (EUV) light source.

Referring to FIG. 1, an LPP EUV light source 100 is formed by irradiating a target mixture 114 at a target location 105 with an amplified light beam 110 that travels along a beam path toward the target location 105. The target location 105, which is also referred to as the irradiation site, is within an interior 107 of a vacuum chamber 130. When the amplified light beam 110 strikes the target mixture 114, a target material within the target mixture 114 is converted into a plasma state that has an element with an emission line in the EUV range. The created plasma has certain characteristics that depend on the composition of the target material within the target mixture 114. These characteristics can include the wavelength of the EUV light produced by the plasma and the type and amount of debris released from the plasma.

The light source 100 also includes a target material delivery system 125 that delivers, controls, and directs the target mixture 114 in the form of liquid droplets, a liquid stream, solid particles or clusters, solid particles contained within liquid droplets or solid particles contained within a liquid stream. The target mixture 114 includes the target material such as, for example, water, tin, lithium, xenon, or any material that, when converted to a plasma state, has an emission line in the EUV range. For example, the element tin can be used as pure tin (Sn); as a tin compound, for example, $SnBr_4$, $SnBr_2$, $SnH_4$; as a tin alloy, for example, tin-gallium alloys, tin-indium alloys, tin-indium-gallium alloys, or any combination of these alloys. The target mixture 114 can also include impurities such as non-target particles. Thus, in the situation in which there are no impurities, the target mixture 114 is made up of only the target material. The target mixture 114 is delivered by the target material delivery system 125 into the interior 107 of the chamber 130 and to the target location 105.

The light source 100 includes a drive laser system 115 that produces the amplified light beam 110 due to a population inversion within the gain medium or mediums of the laser system 115. The light source 100 includes a beam delivery system between the laser system 115 and the target location 105, the beam delivery system including a beam transport system 120 and a focus assembly 122. The beam transport system 120 receives the amplified light beam 110 from the laser system 115, and steers and modifies the amplified light beam 110 as needed and outputs the amplified light beam 110 to the focus assembly 122. The focus assembly 122 receives the amplified light beam 110 and focuses the beam 110 to the target location 105.

In some implementations, the laser system 115 can include one or more optical amplifiers, lasers, and/or lamps for providing one or more main pulses and, in some cases, one or more pre-pulses. Each optical amplifier includes a gain medium capable of optically amplifying the desired wavelength at a high gain, an excitation source, and internal optics. The optical amplifier may or may not have laser mirrors or other feedback devices that form a laser cavity. Thus, the laser system 115 produces an amplified light beam 110 due to the population inversion in the gain media of the laser amplifiers even if there is no laser cavity. Moreover, the laser system 115 can produce an amplified light beam 110 that is a coherent laser beam if there is a laser cavity to provide enough feedback to the laser system 115. The term "amplified light beam" encompasses one or more of: light from the laser system 115 that is merely amplified but not necessarily a coherent laser oscillation and light from the laser system 115 that is amplified and is also a coherent laser oscillation.

The optical amplifiers in the laser system 115 can include as a gain medium a filling gas that includes $CO_2$ and can amplify light at a wavelength of between about 9100 and about 11000 nm, and in particular, at about 10600 nm, at a gain greater than or equal to 1000. Suitable amplifiers and lasers for use in the laser system 115 can include a pulsed laser device, for example, a pulsed, gas-discharge $CO_2$ laser device producing radiation at about 9300 nm or about 10600 nm, for example, with DC or RF excitation, operating at relatively high power, for example, 10 kW or higher and high pulse repetition rate, for example, 50 kHz or more. The optical amplifiers in the laser system 115 can also include a cooling system such as water that can be used when operating the laser system 115 at higher powers.

The light source 100 includes a collector mirror 135 having an aperture 140 to allow the amplified light beam 110 to pass through and reach the target location 105. The collector mirror 135 can be, for example, an ellipsoidal mirror that has a primary focus at the target location 105 and a secondary focus at an intermediate location 145 (also called an intermediate focus) where the EUV light can be output from the light source 100 and can be input to, for example, an integrated circuit lithography tool (not shown). The light source 100 can also include an open-ended, hollow conical shroud 150 (for example, a gas cone) that tapers toward the target location 105 from the collector mirror 135 to reduce the amount of plasma-generated debris that enters the focus assembly 122 and/or the beam transport system 120 while allowing the amplified light beam 110 to reach the target location 105. For this purpose, a gas flow can be provided in the shroud that is directed toward the target location 105.

The light source 100 can also include a master controller 155 that is connected to a droplet position detection feedback system 156, a laser control system 157, and a beam control system 158. The light source 100 can include one or more target or droplet imagers 160 that provide an output indicative of the position of a droplet, for example, relative to the target location 105 and provide this output to the droplet position detection feedback system 156, which can, for example, compute a droplet position and trajectory from which a droplet position error can be computed either on a droplet by droplet basis or on average. The droplet position detection feedback system 156 thus provides the droplet position error as an input to the master controller 155. The master controller 155 can therefore provide a laser position, direction, and timing correction signal, for example, to the laser control system 157 that can be used, for example, to control the laser timing circuit and/or to the beam control system 158 to control an amplified light beam position and shaping of the beam transport system 120 to change the location and/or focal power of the beam focal spot within the chamber 130.

The target material delivery system 125 includes a target material delivery control system 126 that is operable in response to a signal from the master controller 155, for example, to modify the release point of the droplets as released by a delivery mechanism 127 to correct for errors in the droplets arriving at the desired target location 105.

Additionally, the light source 100 can include a light source detector 165 that measures one or more EUV light parameters, including but not limited to, pulse energy, energy distribution as a function of wavelength, energy within a particular band of wavelengths, energy outside of a particular band of wavelengths, and angular distribution of EUV intensity and/or average power. The light source detector 165 generates a feedback signal for use by the master controller 155. The feedback signal can be, for example, indicative of the errors in parameters such as the timing and focus of the laser pulses to properly intercept the droplets in the right place and time for effective and efficient EUV light production.

The light source 100 can also include a guide laser 175 that can be used to align various sections of the light source 100 or to assist in steering the amplified light beam 110 to the target location 105. In connection with the guide laser 175, the light source 100 includes a metrology system 124 that is placed within the focus assembly 122 to sample a portion of light from the guide laser 175 and the amplified light beam 110. In other implementations, the metrology system 124 is placed within the beam transport system 120. The metrology system 124 can include an optical element that samples or re-directs a subset of the light, such optical element being made out of any material that can withstand the powers of the guide laser beam and the amplified light beam 110. A beam analysis system is formed from the metrology system 124 and the master controller 155 since the master controller 155 analyzes the sampled light from the guide laser 175 and uses this information to adjust components within the focus assembly 122 through the beam control system 158.

Thus, in summary, the light source 100 produces an amplified light beam 110 that is directed along the beam path to irradiate the target mixture 114 at the target location 105 to convert the target material within the target mixture 114 into plasma that emits light in the EUV range. The amplified light beam 110 operates at a particular wavelength (that is also referred to as a source wavelength) that is determined based on the design and properties of the laser system 115. Additionally, the amplified light beam 110 can be a laser beam when the target material provides enough feedback back into the laser system 115 to produce coherent laser light or if the drive laser system 115 includes suitable optical feedback to form a laser cavity.

Figure 2A:
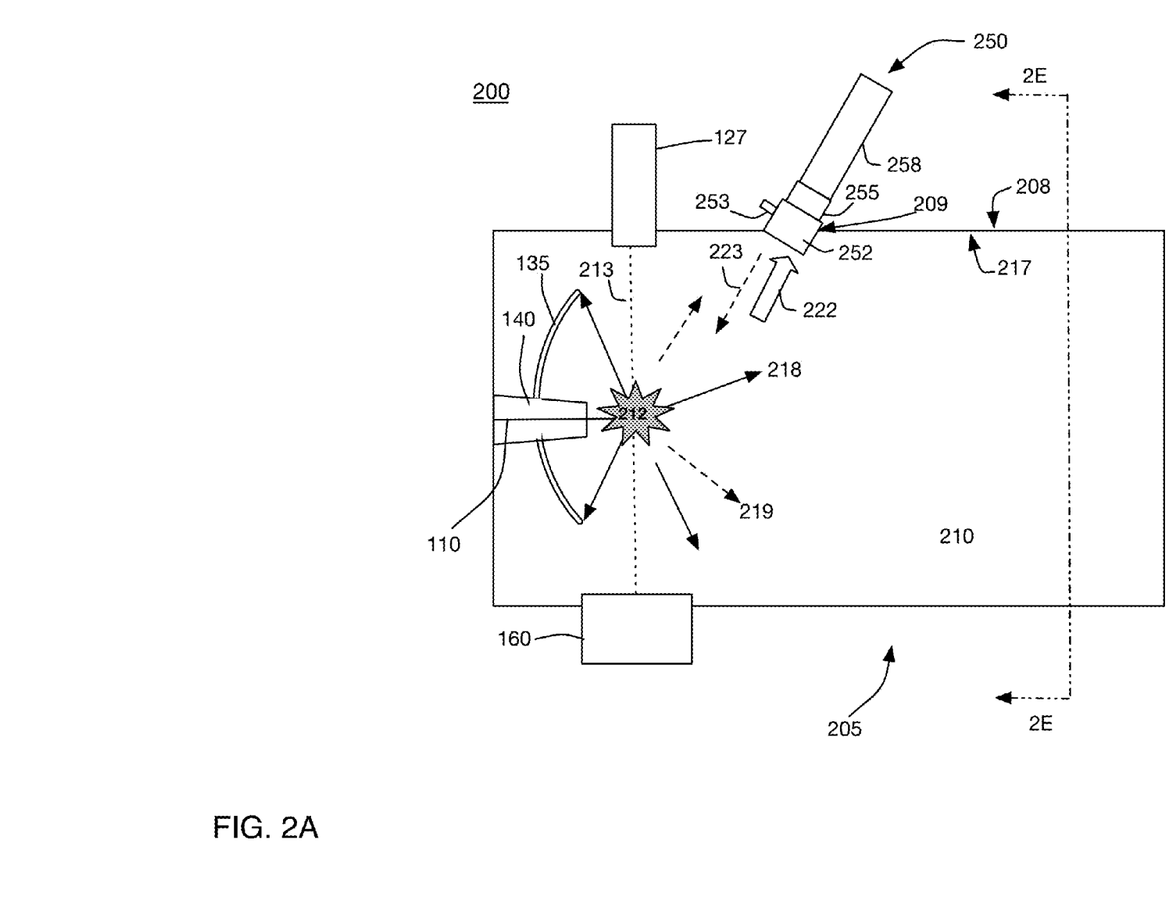
FIG. 2A is a side view of an example vacuum chamber for an EUV light source.

FIG. 2A shows a side view of an example vacuum chamber 200. The vacuum chamber 200 can be similar to the vacuum chamber 130 discussed above with respect to FIG. 1. The vacuum chamber 200 includes a vacuum vessel 205. During use, the vacuum vessel 205 is sealed such that an interior space 210 of the vacuum vessel is maintained as a vacuum.

The interior 210 of the vacuum vessel 205 is monitored and/or observed with an observation assembly 250. The observation assembly 250 includes a valve assembly 252, a viewport assembly 255, and a metrology module 258. The observation assembly 250 is mounted in an opening 209 that passes through the sidewall 208 to form a passage from an exterior of the vacuum vessel 205 to the interior 210. During use, the valve assembly 252 and the viewport assembly 255 are coupled together and aligned with the metrology module 258 to allow the metrology module 258 to observe the interior 210. The valve assembly 252 includes a gate valve 253 that, when closed, allows the viewport assembly 255 to be removed from the valve assembly 252 for replacement or cleaning without disturbing the vacuum in the interior 210.

Figure 2B:
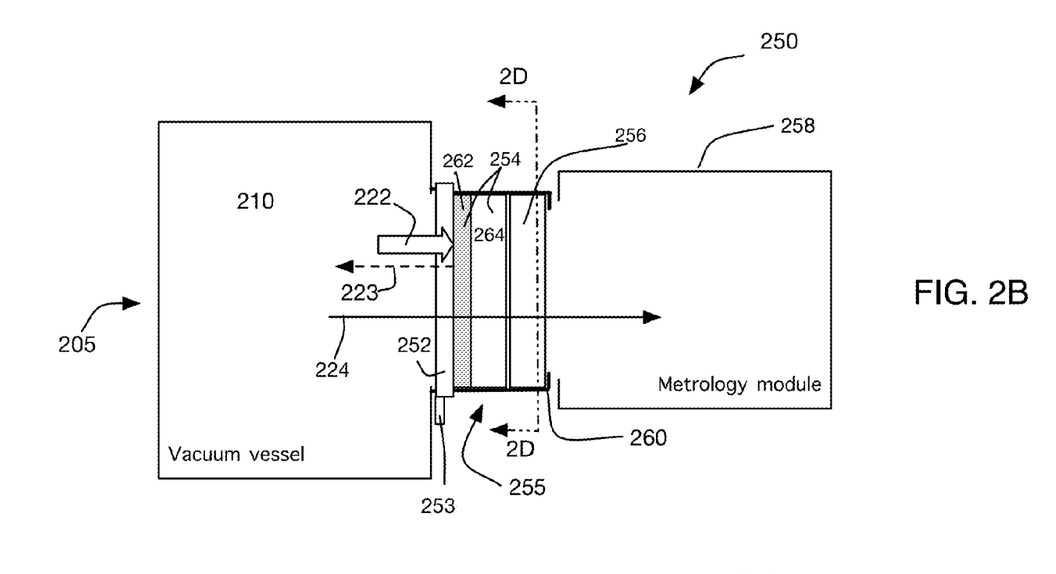
FIG. 2B is a side view of the example observation assembly used with the vacuum chamber of FIG. 2A.
Figure 2C:
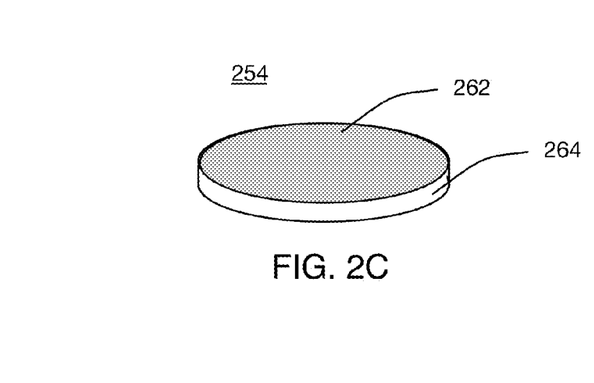
FIG. 2C is a perspective view of an example viewport protector.

FIG. 2B shows a side cross-sectional view of the observation assembly 250 coupled to the vacuum vessel 205. The observation assembly 250 includes the viewport assembly 255. The observation assembly 250 also can include a holder 260 that holds the viewport assembly 255. The viewport assembly 255 includes a viewport 256 and a viewport protector 254 (FIG. 2C). The viewport 256 is an observation window that is positioned to view the interior of the vacuum vessel 205. The viewport 256 includes a window material 270 (FIG. 2D) that is transparent to wavelengths used for observation and/or monitoring, such as visible and near-infrared light. The window material 270 can be, for example, PYREX, fused silica, quartz, glass, or sapphire. The viewport 256 also includes a flange or sleeve 272 that holds the window material 270 and allows the viewport 256 to be coupled to a corresponding connection on the valve assembly 252.

FIG. 2C shows a perspective view of the viewport protector 254. The viewport protector 254 includes a layer 262 and a substrate 264. The substrate 264 can be made of, for example, borasilicate, glass, or quartz. The substrate 264 can be a glass pellicle. In use, the viewport protector 254 is positioned such that the layer 262 faces towards the interior 210.

As discussed below, the layer 262 reduces or prevents light that can cause radiative heating, such as extreme ultraviolet light, deep ultraviolet light, mid-wavelength infrared light, and/or long-wavelength infrared light, from reaching the window material 270 and transmits light, such as visible and near infrared light, that is used to image and/or observe the interior 210. For example, the layer 262 can reflect extreme ultraviolet light, mid-wavelength infrared light, and/or long-wavelength infrared light back into the vacuum vessel 205 and absorb the deep ultraviolet light.

Figure 2D:
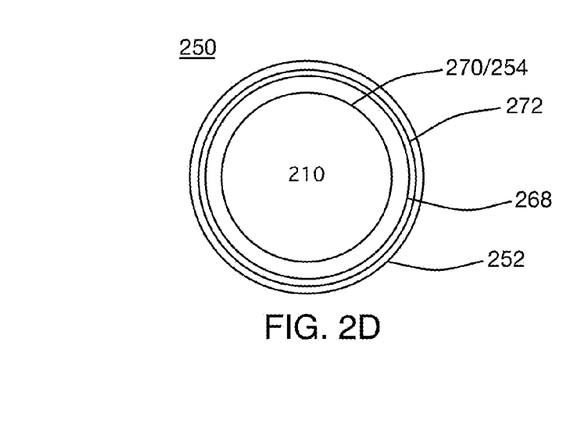
FIG. 2D is a cross-sectional view of the observation assembly of FIG. 2B taken along line 2D-2D.

FIG. 2D shows a cross-sectional view of the observation assembly 250 along the line 2D-2D of FIG. 2B. As shown in FIG. 2D, the valve assembly 252 defines an aperture 268 that allows light to exit and enter the interior 210 of the vacuum vessel 205. Coupling the viewport protector 254 and the viewport 256 to the valve assembly 252, and aligning the viewport protector 254 and the window material 270 with the aperture 268, provides a clear aperture that allows observation of the interior 210 of the vacuum vessel 205. The viewport protector 254 acts to shield the window material 270 of the viewport 256 from light that is capable of radiatively heating the window material 270.

Referring again to FIG. 2A, the vacuum chamber 200 includes the collector mirror 135 and the delivery mechanism 127, both of which are discussed above with respect to FIG. 1. The amplified light beam 110 enters the vacuum vessel 205 and passes through the aperture 140 of the collector mirror 135 to reach a target location 212. The amplified light beam 110 irradiates a droplet of target material in a stream of droplets 213 that is emitted from the delivery mechanism 127. The amplified light beam 110 irradiates a droplet at the target location 212 to produce emitted light 218. The emitted light 218 includes light with wavelengths that correspond to the emission lines of the target material, including EUV light. The emitted light 218 also can include deep ultraviolet (DUV), visible, near infrared (NIR), mid-wavelength infrared (MWIR), and/or long-wavelength infrared (LWIR) light. The EUV light can include light having a wavelength of, for example, 5 nm, 5 nm-20 nm, 10 nm-120 nm, or less than 50 nm. The DUV light can include light having wavelengths between about 120 nm-200 nm, the visible light can include light having wavelengths between 390 nm-750 nm, and NIR light can include light having wavelengths between about 750 nm-2500 nm.

Additionally, when the target material droplet is irradiated with the amplified beam of light 110, the droplet scatters and/or reflects the amplified light beam 110 as reflected light 219. The reflected light 219 has the same wavelength as the amplified light beam 110. The emitted light 218 and the reflected light 219 are collectively referred to as the incident light.

Referring also to FIGS. 2B and 2D, after a droplet is irradiated, the incident light propagates radially outward from the target location 212 towards the collector mirror 135 and the inside walls 217 of the vessel 205. A ray 222 of the incident light reaches the observation assembly 250. The ray 222 exits the vacuum vessel 205 through the aperture 268 and is incident on the layer 262. The layer 262 reflects some or all of the radiative heating components 223 of the ray 222 back into the interior 210 of the vacuum vessel. The layer 262 transmits the observation components 224 that are used by the metrology module 258 to image and/or observe the interior 210.

The radiative heating components 223 can include radiation having a wavelength that is absorbed by the window material 270. For example, the radiative heating components 223 can include EUV, DUV, MWIR, and/or LWIR light. The observation components 224 can include visible and/or NIR light. The layer 262 reflects or absorbs all or substantially all of the radiative heating components 223 to protect the window material 270 from radiative heating while transmitting the observation components 224. For example, the layer 262 can reflect the light having a wavelength that is the same as the amplified light beam while transmitting light having wavelengths that correspond to visible or NIR light. The layer 262 also can absorb DUV light to minimize the amount of DUV light incident on the window material 270 or to prevent DUV light from reaching the window material 270.

The light transmitted by the layer 262 (the observation components 224) enters the substrate 264. Depending on the spectral characteristics of the substrate 264, all or some of the light in the observation components 224 is transmitted to the window material 270 of the viewport 256. The window material 270 is thermally conductive and can develop thermal gradients when exposed to a high heat load and/or a variable heat load.

For example, the window material 270 (and other components in and coupled to the vacuum vessel 205) can experience variable and/or and high heat loads when a pulsed laser is used as the amplified light beam 110. In some implementations, the amplified light beam 110 is a pulsed $CO_2$ laser beam with a duty cycle of 10%, 50%, or 60%, meaning that the laser beam 110 is present in the vacuum chamber 205 10%, 50%, or 60% of the time, respectively. In other examples, the pulsed $CO_2$ beam can have a duty cycle of 90-100%, such that the laser beam 110 is present in the vacuum chamber during at least 90% of system operation. In another example, the amplified light beam 110 can be a 30 kW laser that results in about 15 kW of incident light in the vacuum vessel 205.

Thus, components in and coupled to the vacuum vessel 205 can experience a variable amount of radiative heating depending on the duty cycle of the amplified light beam 110, with higher amounts of heat load (and more thermal stress on components) corresponding to higher duty cycles. However, because the amount of EUV light increases as the duty cycle of the laser beam 110 increases, increasing the duty cycle can be desirable. The additional heating caused when the duty cycle of the laser beam 110 is greater than about 50% can cause the window material 270 to crack (destroying the vacuum seal on the vessel 205) and/or experience thermal lensing (distorting images generated by the metrology module 258). As discussed above, the viewport protector 254 can reduce or eliminate the radiative heating of the window material 270. As such, placing the viewport protector 254 between the viewport 256 and the interior 210 of the vacuum vessel 205 can allow the system to operate more efficiently and reliably at a higher duty cycle, thus increasing the amount of EUV light that can be reliably and safely generated for the scanner system.

The transmission, absorption, and reflection properties of the layer 262 can be varied to suit the application. For example, the viewport protector 254 can be used with a metrology module that includes a camera (not shown) that senses 820 nm light generated by a line laser module (not shown). The line laser module creates a light curtain in the interior 210 of the vacuum chamber in the expected path of the target material droplets, and the light curtain is disturbed when a target material droplet passes through the light curtain. By imaging the light curtain, the camera produces data that can be used to determine whether the target material droplets are positioned accurately with respect to the amplified light beam 110. In this example, the layer 262 only transmits light having a wavelength that is equal to or near the wavelength that the camera senses. The layer 262 can transmit light having wavelengths of about 800-840 nm, while reflecting light (such as the 10.6 µm of the amplified beam of light) that causes radiative heating and reflecting or absorbing light of other wavelengths that are not used by the camera or that could also cause radiative heating.

In another implementation, the viewport protector 254 can be used with the metrology module 258 when the metrology module 258 includes a camera that is sensitive to light having a wavelength of 1070 nm. In this example, the metrology module 258 includes a fiber laser (not shown) produces a light curtain at 1070 nm. The light curtain is positioned in the expected path of the target material droplets. By sensing light at 1070 nm, the metrology module 258 can produce data that shows the presence and location of target material droplets. In this implementation, the layer 262 transmits light that has a wavelength that is equal or near the wavelength sensed by the camera. For example, the layer 262 can transmit light having wavelengths of 1050-1090 nm.

The viewport protector 254 can be used with any metrology module. The layer 262 can be tailored based on the spectral band or particular wavelengths used by the metrology module and to reflect and/or absorb light that causes radiative heating of the substrate 264 and the viewport window material 270. For example, the layer 262 can transmit light having wavelengths of 855-875 nm.

Figure 2E:
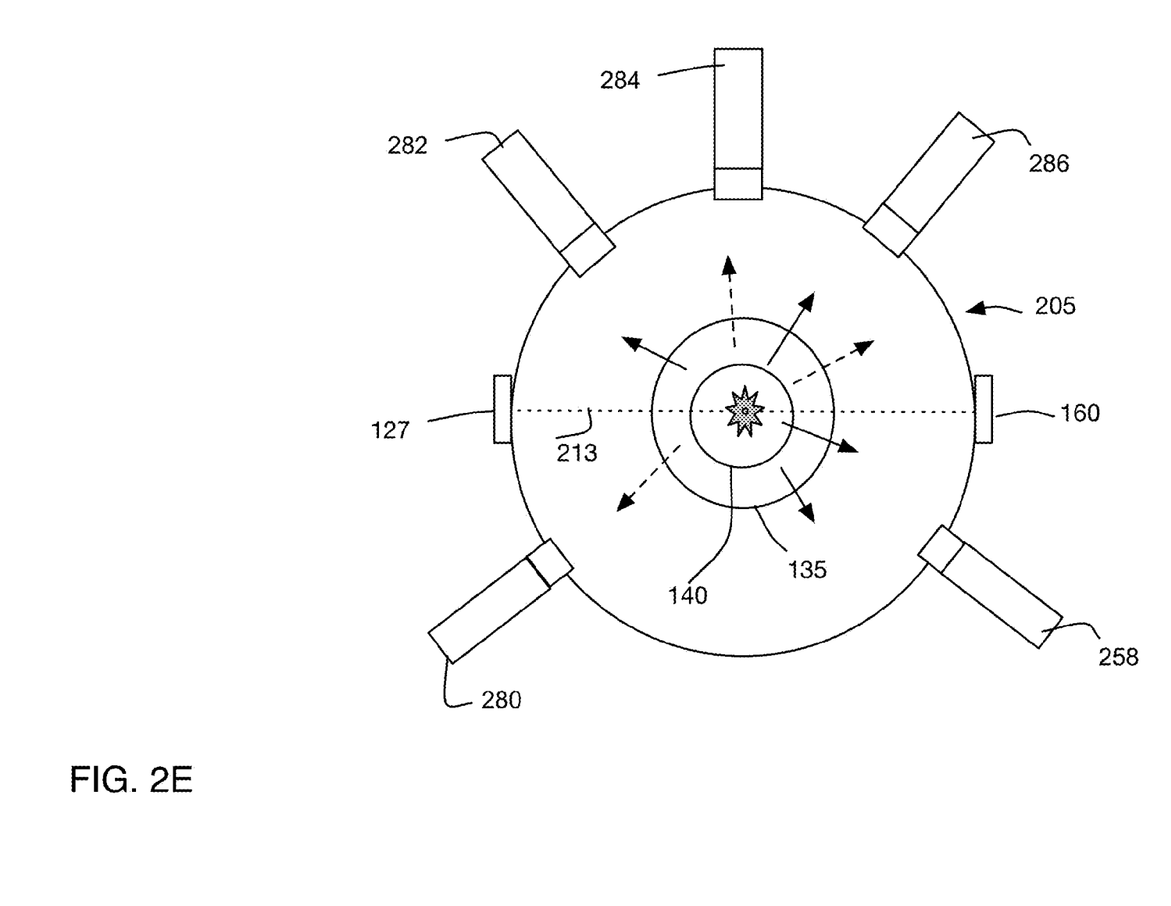
FIG. 2E is a cross-sectional view of the vacuum chamber of FIG. 2A taken along line 2E-2E.

In the example discussed in FIGS. 2A-2D, a single metrology module 258 is shown as being coupled to the vacuum vessel 205. However, multiple metrology modules can be coupled to the vacuum vessel 205. FIG. 2E shows a cross-sectional view of the vacuum vessel 205 of FIG. 2A taken along line 2E-2E. In addition to the metrology module 258, metrology modules 280, 282, 284, and 286 are also coupled to the vacuum vessel 205 and positioned to observe and/or monitor the interior 210. The metrology modules 258, 280, 282, 284, and 286 can have the same or different functions. Each of the metrology modules 280, 282, 284, and 286 is coupled to the vacuum vessel with a valve assembly similar to the valve assembly 252, and each of the modules 280, 282, 284, and 286 can have a viewport protector 254. The layer in any individual viewport protector reflects, absorbs, and transmits wavelengths as appropriate for the function of the particular metrology module.

In the example of FIGS. 2A-2E, the viewport protector 254 is included in the viewport assembly 255. However, the viewport protector 254 can be used with any viewport assembly that can hold the viewport protector 254 with the layer 262 facing towards the interior of the vacuum vessel and away from the viewport window material 270, such as the viewport assemblies 300 and 400 discussed below.

Figure 3A:
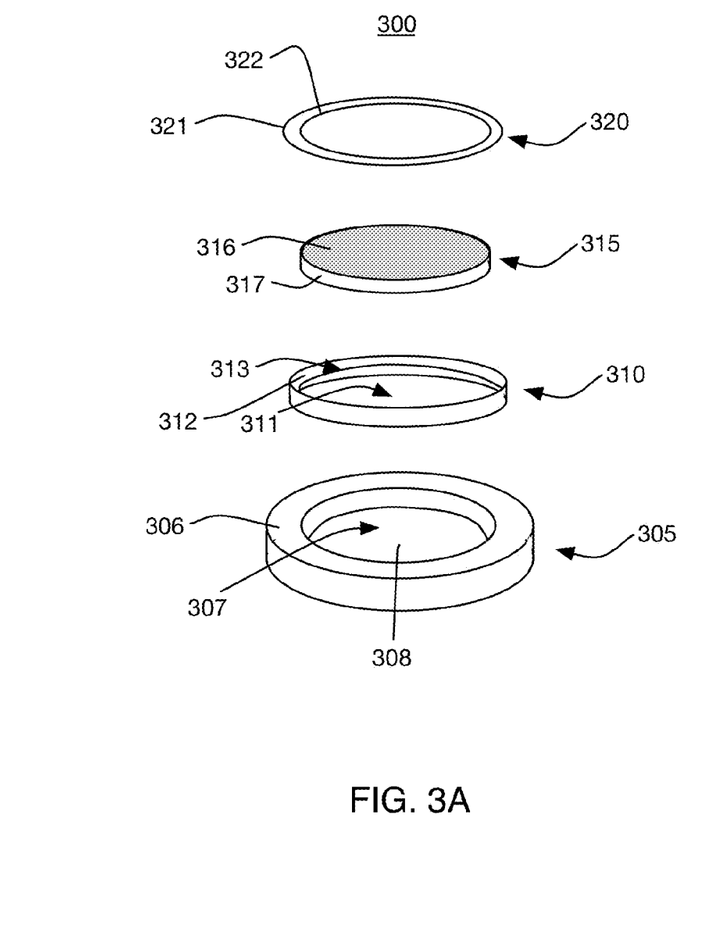
FIG. 3A is an exploded perspective view of an example viewport assembly.
Figure 3B:
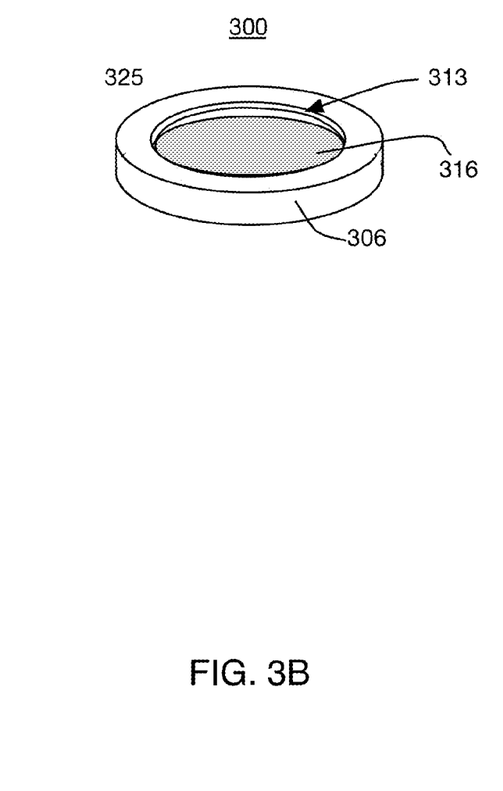
FIG. 3B is a perspective view of the viewport assembly of FIG. 3A.
Figure 3C:
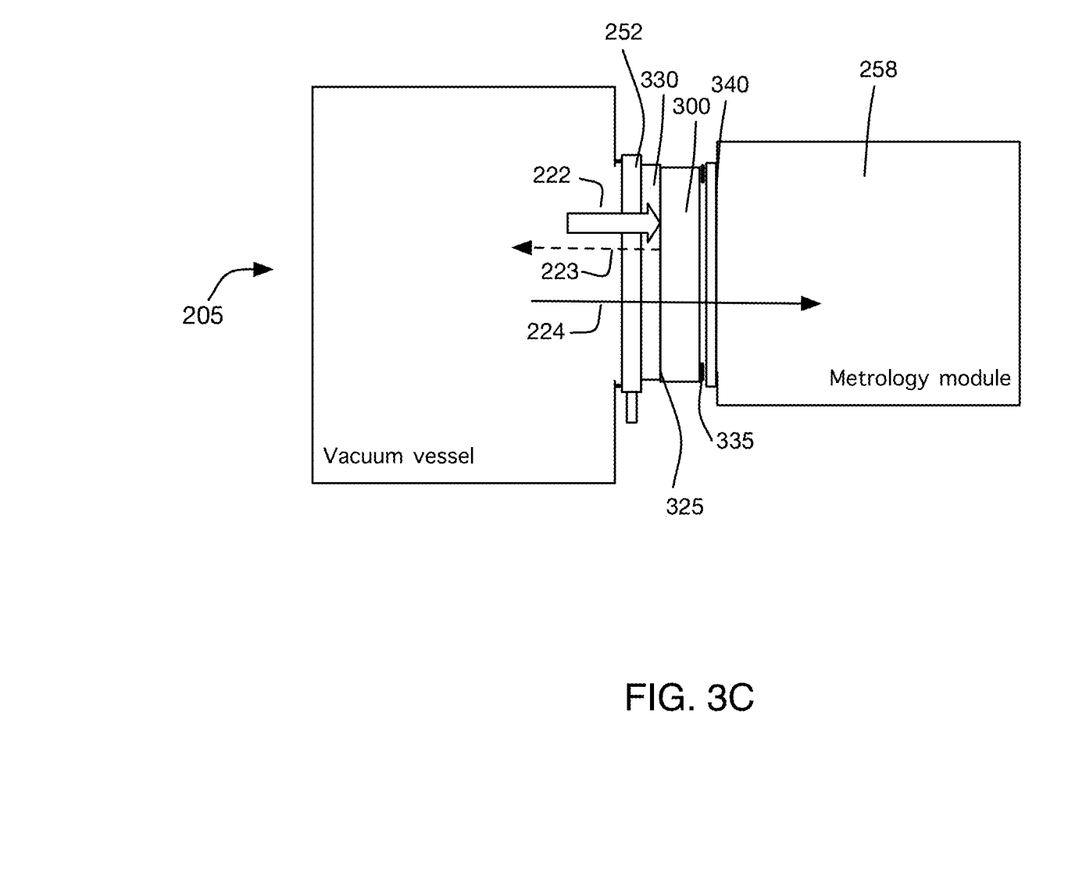
FIG. 3C is a side view of the viewport assembly of FIGS. 3A and 3B used with a vacuum chamber.
Figure 3D:
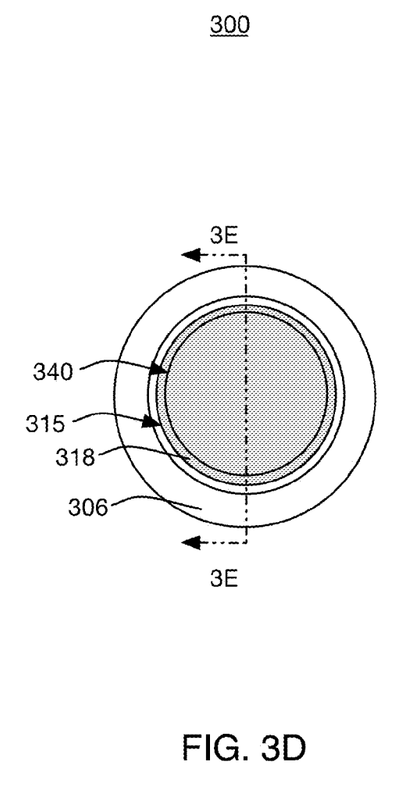
FIG. 3D is a top view of the viewport assembly of FIG. 3A.
Figure 3E:
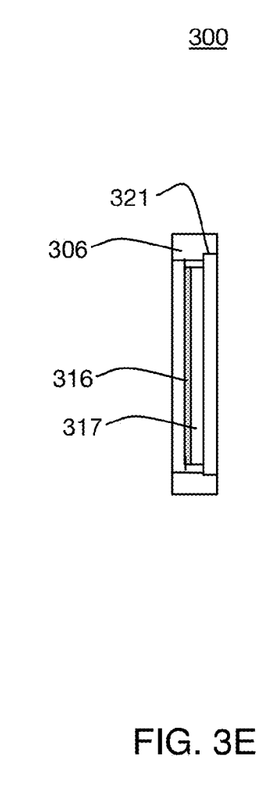
FIG. 3E is a side cross-sectional view of the viewport assembly of FIG. 3D taken along line 3D-3D.

FIGS. 3A, 3B, 3D, and 3E show various views of another example viewport assembly 300. FIG. 3A shows an exploded perspective view of the viewport assembly 300, FIG. 3B shows a perspective view of the viewport assembly 300, FIG. 3D shows a top view of the viewport assembly 300, and FIG. 3E shows a side cross-section of the assembled viewport assembly 300. FIG. 3C shows the viewport assembly 300 coupled to the vacuum vessel 205 and the metrology module 258.

Referring to FIG. 3A, the viewport assembly 300 includes a viewport 305, a holder 310, a viewport protector 315, and a locking element 320. The viewport 305 includes a flange 306 that defines an aperture 307 that is covered by a window material 308. The window material 308 is transparent to light that is used to observe an interior of a vacuum chamber. For example, the window material 308 can be PYREX, fused silica, quartz, glass, or sapphire.

The viewport assembly 300 also includes the holder 310, which can be a ring-shaped holder that defines an aperture 311. The viewport assembly 300 also includes a viewport protector 315. The viewport protector 315 includes a layer 316 and a substrate 317. The viewport protector 315 can be the same as, or similar to, the viewport protector 254 discussed with respect to FIGS. 2A-2E. The viewport assembly 300 also includes the locking element 320. The locking element 320 has an outer surface 321 and an inner surface 322.

Referring to FIG. 3B, a perspective view of the viewport assembly 300 is shown. To construct the viewport assembly 300, the holder 310 is received in the aperture 307 of the viewport 305, and the aperture 311 of the holder 310 receives the viewport protector 315. The locking element 320 fits into the aperture 311 of the holder 310 above the viewport protector 315, with the outer surface 321 of the locking element 320 in contacts with an inner surface 312 of the holder 310 to secure the viewport protector 315 in the holder 310. The locking element 320 can have threads on the outer surface 321 that mate with threads 313 formed on the inner surface 312 of the holder 310. The viewport protector 315 is positioned with the layer 316 facing towards a top side 325 of the viewport assembly 300.

Referring to FIG. 3C, the viewport assembly 300 is connected to the valve assembly 252 by a gasket 330. When the viewport assembly 300 is coupled to a vacuum vessel, the top side 325 is positioned so that the layer 316 faces toward the interior of the vacuum vessel 205. Orienting the layer 316 in this manner protects the window material 308 (FIG. 3A) from radiative heating. The metrology module 258 is connected to the viewport assembly 300 with a mounting bracket 335.

In some implementations, the gasket 330 is a standard copper gasket, and the viewport assembly 300 can be sealed to a valve assembly (such as the valve assembly 252) with a standard copper gasket such as are available from MDC Vacuum Products LLC of California. The use of a standard copper gasket instead of a custom gasket results in the viewport assembly 300 having a larger clear aperture through which to view the interior of a vacuum vessel. A larger clear aperture allows more light from the vacuum vessel to reach the metrology module, and can result in improved monitoring and imaging of the interior of the vacuum vessel. Further, because the sealing gasket is typically a consumable item that is replaced each time the viewport assembly 300 is removed from the valve assembly 252, using a standard gasket can also result in a lower cost viewport assembly 300.

Referring to FIG. 3D, a top view of the viewport assembly 300 is shown. The locking element 320 is the only component placed on top of the viewport protector 315, and a ring-shaped gasket (not shown) that defines an aperture is placed beneath the viewport protector 315 to seal the viewport assembly 300. Because the viewport protector 315 is received in the holder 310 and secured in the holder 310 with the locking element 320, only a circumferential edge 318 of the viewport protector 315 is obscured by other components of the viewport assembly 300. Thus, the viewport assembly 300 defines a clear aperture 340 through which an interior of a vacuum vessel can be observed. The mounting bracket 335 that holds the viewport assembly 300 to the metrology module 258 defines an aperture (not shown) that has a diameter at least as large as the diameter of the clear aperture 340.

FIG. 3E shows a side cross-sectional view of the viewport assembly 300. As shown, when assembled, the components of the viewport assembly 300 fit within the flange 306 of the viewport 305. Thus, the viewport protector 315 can be placed in the viewport assembly 300 and fit to an existing viewport on a vacuum vessel with a standard copper gasket for sealing.

Figure 4A:
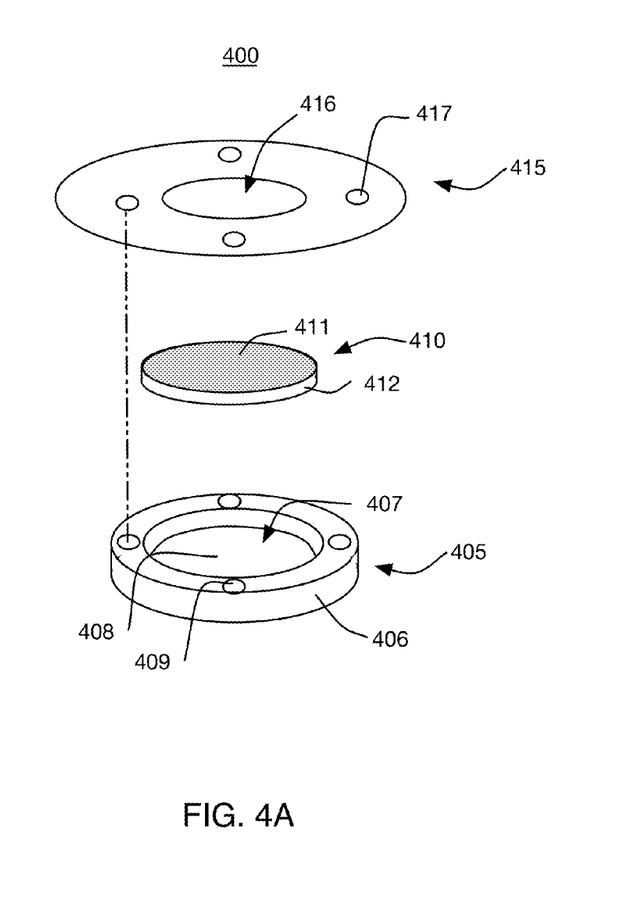
FIG. 4A is an exploded perspective view of another example viewport assembly.
Figure 4B:
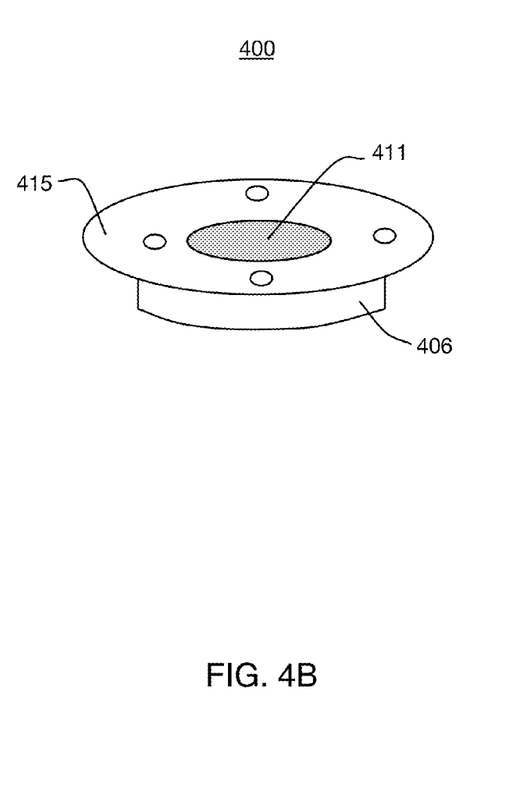
FIG. 4B is a perspective view of the viewport assembly of FIG. 4A.
Figure 4C:
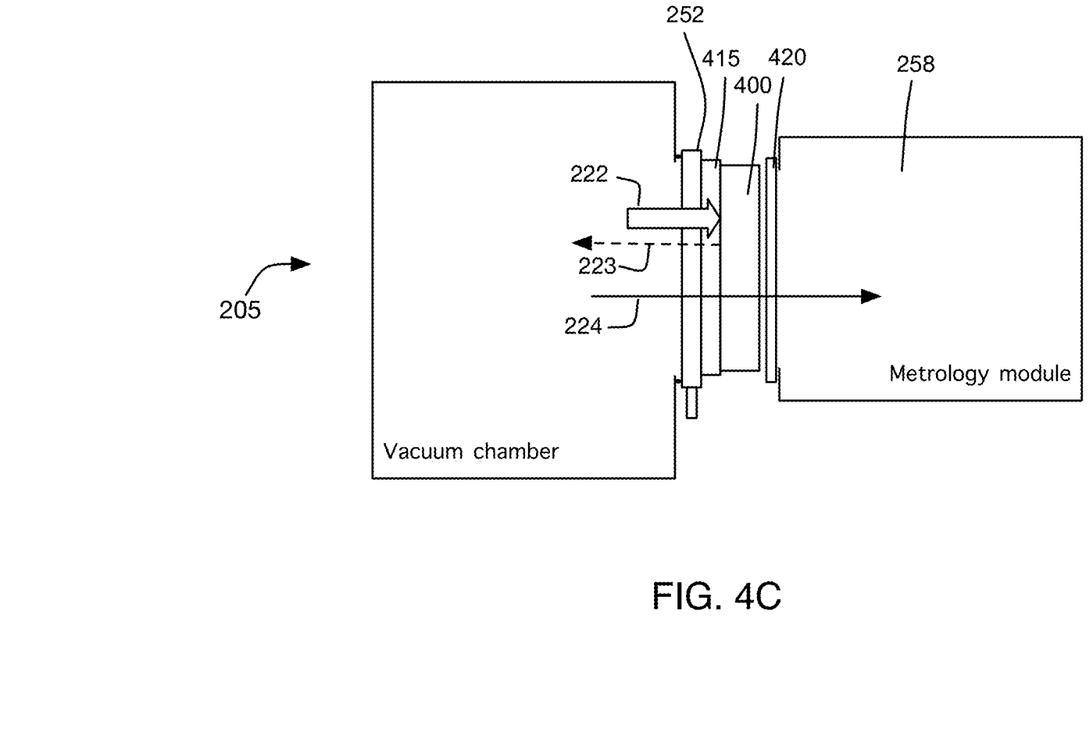
FIG. 4C is a side view of the viewport assembly of FIGS. 4A and 4B used with a vacuum chamber.

Referring to FIG. 4A, an exploded perspective view of another example viewport assembly 400 is shown. FIG. 4B shows a perspective view of the viewport assembly 400. FIG. 4C shows the viewport assembly 400 coupled to the vacuum vessel 205 and the metrology module 258. As compared to the viewport assembly 300, the viewport assembly 400 uses a custom gasket and does not include a locking element or a separate holder for the viewport protector 315.

Referring to FIG. 4A, the viewport assembly 400 includes a viewport 405, a viewport protector 410, and gasket 415. The viewport 405 includes a flange 406 that defines an aperture 407 that is covered by a window material 408. The window material 408 is transparent to light that is used to observe an interior of a vacuum chamber. For example, the window material 408 can be PYREX, fused silica, quartz, glass, or sapphire. The flange 406 also defines connection holes 409.

The viewport protector 410 includes a layer 411 and a substrate 412. The viewport protector 410 can be the same as, or similar to, the viewport protector 254 discussed with respect to FIGS. 2A-2E. The gasket 415 defines an aperture 416 and connection holes 417.

FIG. 4B shows a perspective view of the viewport assembly 400. To construct the assembly 400, the viewport protector 410 is received in the aperture 407. The gasket 415 is placed over the viewport protector 410 and onto the flange 406. The gasket 415 holds to viewport protector 410 in the flange 406 and seals the viewport assembly 400 to the valve assembly 252. Thus, the viewport assembly 400 does not include a separate holder to secure the viewport protector 410 to the viewport 405. The connection holes 417 of the gasket 415 are connected to connection holes 409 with screws or other fasteners.

Referring to FIG. 4C, the viewport assembly 400 is connected to the valve assembly 252 by connecting the gasket 415 to the valve assembly 252. When the viewport assembly 400 is coupled to the valve assembly 252, the viewport assembly is positioned so that the layer 411 faces toward the interior of the vacuum vessel 205. Orienting the layer 411 in this manner protects the window material 408 from radiative heating. The metrology module 258 is connected to the viewport assembly 400 with a mounting bracket 420.

Figure 5:
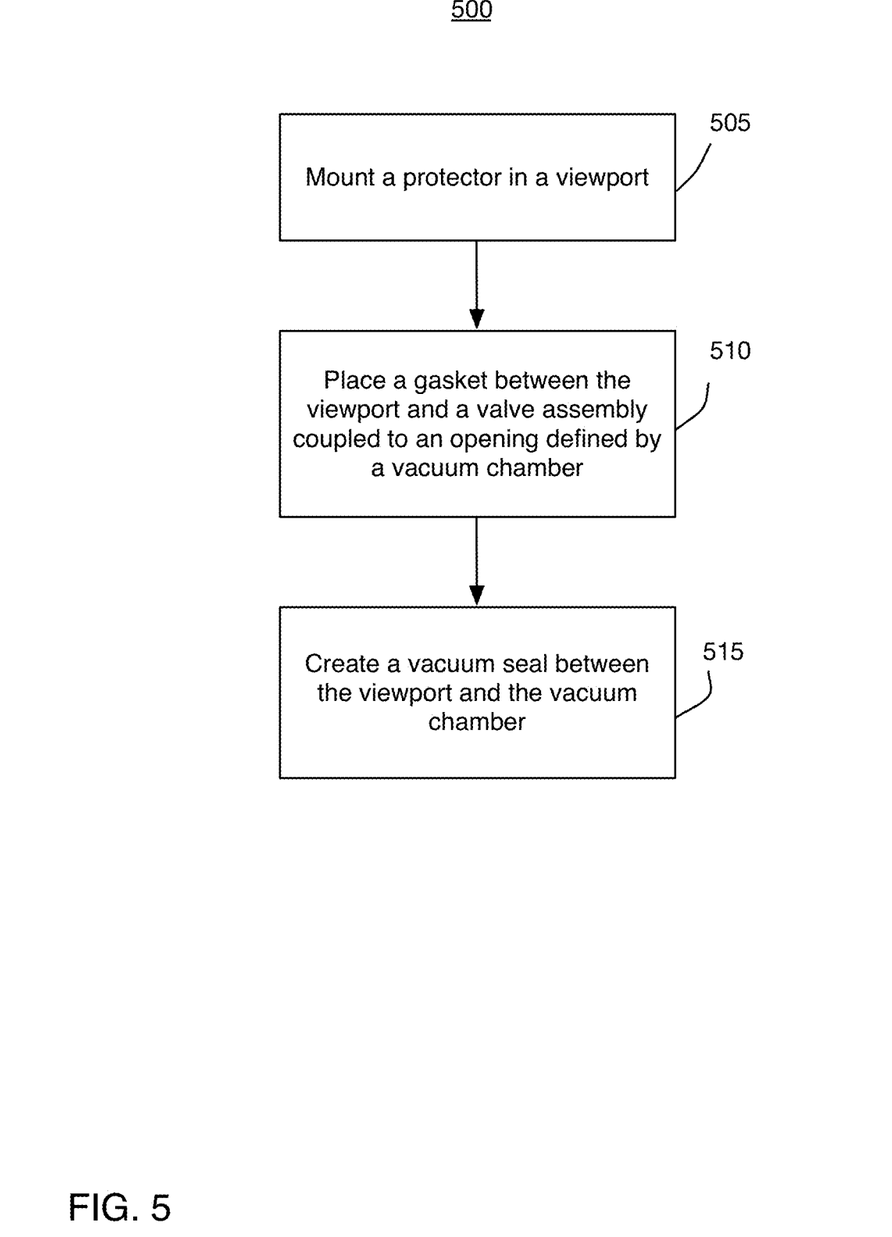
FIG. 5 is an example process for protecting a viewport.

FIG. 5 shows an example process 500 for protecting a viewport of an extreme ultraviolet (EUV) light source. The process 500 can be performed with any of the viewport protectors 252, 315, and 410, and with any of the viewport assemblies 255, 300, and 400.

A protector is mounted in a viewport (505). The protector can be any of the viewport protectors 252, 315, and 410. The protector includes a substrate that absorbs radiation in a first spectral band and transmits radiation a second spectral band. The protector also includes a layer that reflects radiation in the first spectral band. In the absence of the layer, the substrate absorbs radiation in the first spectral band, which can cause the substrate to heat, leading to cracking or thermal lensing. The layer reflects radiation in the first spectral band. Thus, when the layer is positioned between the source of the radiation and the substrate, the layer protects the substrate from heating by reflecting radiation in the first spectral band away from the substrate such that the radiation is not absorbed by the substrate. Further, the substrate and the layer can transmit light having wavelengths in the visible and near infrared (NIR) spectral regions.

For example, the substrate can absorb light having a wavelength that is the same as the wavelength of the amplified light beam 110, and the layer can reflect this radiation to protect the substrate. Thus, the protector in this example reflects light having a wavelength that is the same as the wavelength of the amplified light beam 110 and transmits light having wavelengths that correspond to visible or NIR light. By doing so, the protector allows observation through the viewport while also protecting the viewport from thermal damage.

In another example, the substrate can also absorb (and be heated by) some of the light that is created when a target material droplet is converted to plasma, such as DUV light, EUV light, and other ultraviolet light. In this example, the layer is configured to absorb DUV light and to reflect EUV and other ultraviolet light to protect the substrate from being heated by absorbing radiation with these wavelengths.

The viewport can be any of the viewports 256, 305, and 405. In some implementations, the first spectral band includes 10.6 µm. In some implementations mounting the protector in the viewport includes first mounting the protector in a holder (such as the holder 310 of FIG. 3A), and then mounting the holder with the protector into an aperture defined by the viewport.

A gasket is placed between the viewport and a valve assembly that is coupled to an opening defined by a vacuum chamber (510). The valve assembly can be the valve assembly 252. The gasket can be a standard copper gasket, or any other gasket used to seal a viewport to a valve assembly. The gasket can be a custom gasket such as the gasket 415 discussed with respect to FIGS. 4A-4C. A vacuum seal is created between the viewport and an interior of the vacuum chamber (515).

Other implementations are within the scope of the following claims. For example, the viewport protector 254, 315, and 410 and the various apertures in the viewport assemblies 255, 300, and 400 are illustrated as having a circular shape. However, these items can have other shapes. The layers 262, 316, and 411 can protect the window material of the viewport by reflecting and/or absorbing radiation that is capable of heating the window material of the viewport such that the radiation that is capable of heating the window material is not incident on the window material.

What is claimed is:

1. An assembly comprising:
a protector for a viewport of a vacuum chamber of an extreme ultraviolet (EUV) light source, an interior of the vacuum chamber being configured to receive an amplified light beam and a target material, the target material comprising a material that produces emitted light when converted to plasma by the amplified light beam, the emitted light comprising EUV light, the protector comprising:
a substrate, the substrate comprising a material that absorbs radiation having a wavelength of the amplified light beam, and that transmits one or more of visible and near-infrared light, and
a layer formed on the substrate, wherein the layer reflects radiation having the wavelength of the amplified light beam and radiation having the wavelength of the EUV light produced when the material is converted to plasma; and
a mount configured to hold the protector with the layer facing towards the interior of the vacuum chamber.

2. The assembly of claim 1, wherein the substrate comprises a glass pellicle.

3. The assembly of claim 1, wherein the amplified light beam has a wavelength of about 10.6 μm.

4. The assembly of claim 1, wherein the layer transmits one or more of visible and near-infrared radiation.

5. The assembly of claim 4, wherein the layer only transmits radiation having a wavelength from 855 nm to 875 nm.

6. The assembly of claim 4, wherein the layer only transmits radiation having a wavelength from 800 nm to 840 nm.

7. The assembly of claim 4, wherein the layer only transmits radiation having a wavelength from 1050 nm to 1090 nm.

8. The assembly of claim 1, wherein the mount comprises a holder that receives and surrounds the protector, and the holder is configured to fit into an aperture defined by the viewport.

9. The assembly of claim 8, wherein the mount further comprises a locking element that secures the protector in the holder.

10. The assembly of claim 8, wherein the holder and the locking element are ring-shaped.

11. The assembly of claim 10, wherein the locking element and the holder have corresponding threads, and the locking element is screwed into the holder to secure the protector in the holder.

12. The assembly of claim 1, wherein at least a portion of the viewport is at least a portion of the mount.

13. The assembly of claim 1, wherein the emitted light comprises radiation at a plurality of other wavelengths that are different than a wavelength of the EUV light, and the layer reflects the radiation having a wavelength included in the plurality of other wavelengths.

14. The assembly of claim 13, wherein the wavelength of the amplified light beam is not one of the plurality of other wavelengths.

15. The assembly of claim 13, wherein the emitted light comprises EUV light, deep ultraviolet (DUV) light, visible light, near-infrared light, mid-wavelength infrared light, and long-wavelength infrared light.

16. The assembly of claim 13, wherein the emitted light comprises wavelengths in an emission spectra of the target material.

17. The assembly of claim 1, wherein the EUV light comprises light having a wavelength of 50 nanometers (nm) or less.

18. An extreme ultraviolet (EUV) light source comprising:
a vacuum chamber that receives an amplified light beam, the vacuum chamber comprising a side wall that defines an opening to an interior of the vacuum chamber, an interior of the vacuum chamber being configured to receive an amplified light beam and a target material, the target material comprising a material that produces emitted light when converted to plasma by the amplified light beam, the emitted light comprising EUV light;
a viewport coupled to the vacuum chamber; and
a protector coupled to the viewport and facing towards the opening to the interior of the vacuum chamber, the protector comprising:
a substrate, the substrate comprising a material that absorbs radiation having a wavelength of the amplified light beam,
and that transmits one or more of visible and near-infrared light, and
a layer formed on the substrate material, wherein the layer reflects radiation having the wavelength of the amplified light beam and radiation having a wavelength of the EUV light produced when the target material is converted to plasma by the amplified light beam.

19. The light source of claim 18, further comprising a mount configured to couple the protector to the viewport.

20. The light source of claim 18, wherein the substrate comprises a glass pellicle.

21. The light source of claim 18, wherein the viewport comprises a ring-shaped disk that defines an aperture, and the protector is coupled to the viewport by placing the protector in the viewport such that the layer of the protector faces toward the interior of the vacuum chamber and a center of the protector corresponds with a center of the aperture.

22. The light source of claim 21, further comprising a standard copper gasket configured for placement between the viewport and the vacuum chamber.

23. The light source of claim 21, wherein the layer transmits one or more of visible or near infrared radiation.

24. The light source of claim 18, wherein the EUV light comprises light having a wavelength of 50 nanometers (nm) or less.

25. The light source of claim 18, wherein the amplified light beam has a wavelength of 10.6 μm.

26. The light source of claim 18, wherein the emitted light comprises a plurality of wavelengths, the plurality of wavelengths comprising wavelengths associated with the EUV light and other wavelengths, and the layer reflects radiation having a wavelength of at least one of the other wavelengths.

27. The light source of claim 18, wherein the layer transmits one or more of visible light and near-infrared light.

28. The light source of claim 27, further comprising a metrology module coupled to the viewport, the protector being between the metrology module and the interior of the vacuum chamber, and the metrology module being configured to detect one of more of visible light and near-infrared light and to produce images of the interior of the vacuum chamber based on the detected one or more of the visible light and the near-infrared light.

\* \* \* \* \*